United States Patent [19]

Coats

[11] 3,707,999
[45] Jan. 2, 1973

[54] MOVING SHADOW LIGHT INDEXING MEANS

[76] Inventor: Jesse C. Coats, P.O. Box 167, Horse Shoe Bend, Idaho 83629

[22] Filed: Jan. 25, 1971

[21] Appl. No.: 109,407

[52] U.S. Cl. .................................... 83/438, 83/520
[51] Int. Cl. ............................................. B27b 27/10
[58] Field of Search ...143/168 B, 168 R, 37; 83/520, 83/522

[56] References Cited

UNITED STATES PATENTS

| | | | |
|---|---|---|---|
| 1,476,238 | 12/1923 | Bump | 143/168 B |
| 2,806,492 | 9/1957 | Becker | 143/168 B |
| 3,638,692 | 2/1972 | Carter et al. | 143/168 B |

Primary Examiner—Donald R. Schran
Attorney—John W. Kraft

[57] ABSTRACT

The present invention comprises a rotating drum assembly mounted on a framework above a conveyor assembly disposed transversely to the drum, a cross conveyor in the conveyor assembly operable to drivingly feed lumber into a saw assembly. The rotating drum assembly is provided with a multiplicity of groups of wires suitably fastened to the opposite terminal end plates of the drum and a light projecting source suitably mounted in the drum being operable to project light through unit groups of wires passing under the light projecting source in response to rotation of the drum and to project shadow impages of the wires upon lumber traveling on the conveyor therebeneath. The drum assembly also includes a parallax guide suitably fixed inside the rotating drum assembly operable to planarly orient unit groups of wires on the drum as they are caused to pass over the guide in response to rotation of the drum. The wires of each of the unit groups are parallelly spaced apart on the drum a distance geometrically coincident with the spacing of parallel mounted saw blades in the saw assembly. Each unit group of wires on the drum are spaced apart a distance geometrically coincident with the spacing of lumber guide bars on the conveyor assembly. Adjusting means is provided on the drum assembly to interrupt the synchronous drive of the drum operable to selectively align shadow impages on a selected piece of lumber being carried by a respective guide bar on the conveyor. The adjusting means is electrically interconnected to the saw assembly to selectively align saw blades coincident with the shadow line images on the lumber.

The conveyor assembly comprises an endless conveyor disposed about a table framework and including a multiplicity of equally spaced guide bars disposed transversely to the direction of travel of the conveyor. Means are provided on the table to urge lumber on the table against respective guide bars. A cross conveyor is distally disposed near one of the terminal ends of the conveyor being operable to drivingly feed lumber into the saw assembly. Driving rollers in the cross conveyor are disposed at an angle between a pair of opposing side frame members. In this manner lumber tends to be drivingly fed into the saw assembly and urged against one of the side frame members. Lumber is drivingly fed into the saw assembly from a preselected fixed datum reference guide formed by the side frame member. Hence, the relationship between the datum reference guide and the preselected position of saws in the saw assembly is the same as the relationship of projected shadow images on the lumber and its position against the respective guide bar on the conveyor assembly. Means are provided on the conveyor table to selectively support lumber above the cross conveyor and to planarly drop the lumber flatly onto the cross conveyor. Electrically interconnecting control means are also provided to selectively lower individual saw blades into engagement with respective pieces of lumber.

6 Claims, 3 Drawing Figures

JESSE C. COATS INVENTOR.

BY

MOVING SHADOW LIGHT INDEXING MEANS

FIELD OF INVENTION

This invention relates to shadow light indexing means operable to position and align lumber or the like for sawing, and more particularly to a shadow light indexing means operable to position and align lumber or the like while it is traveling upon a conveyor.

BRIEF DESCRIPTION OF THE PRIOR ART

Shadow light indexing means known in the prior art generally comprise a light projecting housing having a multiplicity of wires stretched beneath the housing operable to project a shadow image upon a piece of lumber therebeneath. The wires are spaced apart at intervals corresponding to the relationship of a plurality of saw blades mounted on a mandrel in a saw assembly. The housing is mounted above a conveyor carrying lumber and is adapted to be moved transversely to position shadow images at a desired location on a piece of lumber. The housing is electrically interconnected through commonly known controllers with the saw assembly so that saws in the saw assembly may be positioned relative to the selected location of the housing. Means are also usually provided to selectively raise and lower selected saw blades into and out of engagement with a piece of lumber to be sawed. Such apparatus is commonly used to edge lumber and thereby cut away rough and uneven portions and to cut out sections of unwanted knots from the lumber. Heretofore, pieces of lumber had to be stopped and positioned beneath the shadow light indexing means so that the shadow images could be selectively aligned on the lumber. Thereafter an electrically switched address was transmitted to a saw assembly to position the saws to cut the lumber as desired.

Accordingly, it is an extremely important object of this invention to provide a shadow light indexing means operable to selectively align shadow images upon pieces of lumber while the lumber is moving and without interruption to the movement of lumber upon a conveyor.

Another object of this invention is to provide in a shadow light indexing means a rotating drum having a multiplicity of unit groups of indexing wires spaced apart at intervals geometrically in proportion to lumber guide bars on a conveyor transversely disposed beneath the shadow light indexing means, and means to synchronously drive the rotating drum and the conveyor.

A further object of the present invention is to provide means to selectively adjust the rate of rotation of the drum with respect to the rate of travel of the conveyor to selectively align shadow images projected onto a piece of lumber by means in the drum while the drum and the conveyor are being sychronously driven at corresponding rates of speed to one another.

Another object of this invention is to provide means in a shadow light indexing means to orient wires on the drum to a planar position which tends to avoid distortion of the shadow image projected.

These and other objects shall become apparent from the description following, it being understood that modifications may be made without affecting the teachings of the invention here set out.

Generally the present invention comprises a rotating drum assembly mounted on a framework above a conveyor assembly disposed transversely to the drum, a cross conveyor in the conveyor assembly operable to drivingly feed lumber into a saw assembly. The rotating drum assembly is provided with a multiplicity of groups of wires suitable fastened to the opposite terminal end plate of the drum and a light projecting source suitably mounted in the drum being operable to project light through unit groups of wires passing under the light projecting source in response to rotation of the drum and to project shadow images of the wires upon lumber traveling on the conveyor therebeneath. The drum assembly also includes a parallax guide suitably fixed inside the rotating drum assembly operable to planarly orient unit groups of wires on the drum as they are caused to pass over the guide in response to rotation of the drums. The wires of each of the unit groups are parallelly spaced apart on the drum a distance geometrically coincident with the spacing of parallel mounted saw blades in the saw assembly. Each unit group of wires on the drum are spaced apart a distance geometrically coincident with the spacing of lumber guide bars on the conveyor assembly. Adjusting means is provided on the drum assembly to interrupt the synchronous drive of the drum operable to selectively align shadow images on a selected piece of lumber being carried by a respective guide bar on the conveyor. The adjusting means is electrically interconnected to the saw assembly to selectively align saw blades coincident with the shadow line images on the lumber.

The conveyor assembly comprises an endless conveyor disposed about a table framework and including a multiplicity of equally spaced guide bars disposed transversely to the direction of travel of the conveyor. Means are provided on the table to urge lumber on the table against respective guide bars. A cross conveyor is distally disposed near one of the terminal ends of the conveyor being operable to drivingly feed lumber into the saw assembly. Driving rollers in the cross conveyor are disposed at an angle between a pair of opposing side frame members. In this manner lumber tends to be drivingly fed into the saw assembly and urged against one of the side frame members. Lumber is drivingly fed into the saw assembly from a preselected fixed datum reference guide formed by the side frame member. Hence, the relationship between the datum reference guide and the preselected position of saws in the saw assembly is the same as the relationship of projected shadow images on the lumber and its position against the respective guide bar on the conveyor assembly. Means are provided on the conveyor table to selectively support lumber above the cross conveyor and to planarly drop the lumber flatly onto the cross conveyor. Electrically interconnecting control means are also provided to selectively lower individual saw blades into engagement with respective pieces of lumber.

A more thorough and comprehensive understanding may be had from the detailed description of the preferred embodiment when read in connection with the drawings forming a part of this specification.

DETAILED DESCRIPTION OF THE PREFERRED EMBODIMENT

Figure 1:
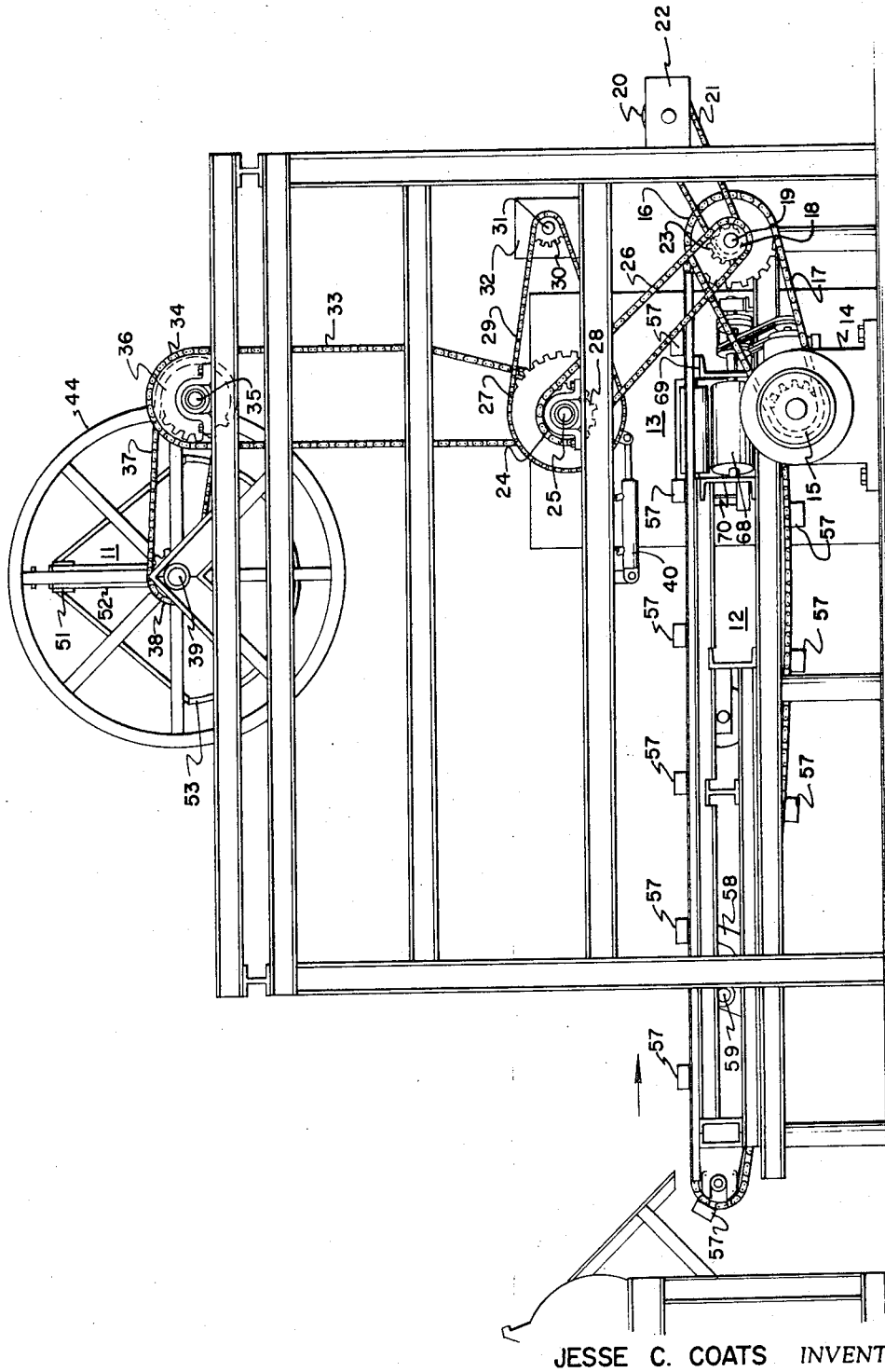
FIG. 1 is a side elevational view of the several assemblies and sub-assemblies of the shadow light indexing means of this invention showing to advantage the rotating drum assembly, the conveyor assembly, the saw assembly and the synchronous drive arrangement of this invention.

Referring now to the drawings and more particularly to the FIG. 1 showing the overall assembly of the moving shadow light indexing apparatus of this invention generally identified by the numeral 10. The apparatus 10 generally includes a light indexing rotating drum assembly 11 disposed above a conveyor table assembly 12 and a saw assembly 13. The assemblies 11, 12, and 13 are synchronously driven from a suitable driving source such as motor 14 and a multiplicity of sprocket and chain drive assemblies connected to the several assembly and sub-assembly elements of this invention. That is to say, a driving sprocket 15 is drivingly connected to a conveyor table assembly driving sprocket 16 through a chain 17. A sprocket 18 is suitably fastened to a shaft 19 and the adjacent sprocket 16 is drivingly connected to a sprocket 20 through a chain 21 to a saw selector switching box 22 hereinafter later described. A sprocket 23 on the shaft 19 adjacent conveyor table driving sprocket 16 is drivingly connected to a sprocket 24 on a shaft 25 through a chain 26. A pair of adjacent sprockets 27 and 28 carried by a commonly known "slip" bearing (not shown) journaled for rotation on the shaft 25 are mounted adjacent the driven sprocket 24. The sprocket 27 is drivingly connected by chain 29 to a sprocket 30 mounted to a shaft 31 journaled for rotation in a saw positioning switching box assembly 32 hereinafter later described. Sprocket 28 is drivingly connected through a chain 33 to a sprocket 34 mounted on a shaft 35. A sprocket 36 mounted on the shaft 35 adjacent the sprocket 34 is drivingly connected through a chain 37 to a sprocket 38 mounted on the drive shaft 39 having the light projecting rotating drum assembly mounted thereon. It is to be understood each of the drive transmission assemblies above described are journaled for rotation in bearings suitably mounted to the framework of the apparatus 10 and include chain tensioning idler sprockets commonly used in assembly of such drive transmission assemblies. Although chain and sprocket driving arrangements have been selected to describe the synchronous driving of the various assemblies described, it may also be readily seen that each of the assemblies might be separately driven by separate motors having electrically interlocking controls.

Before describing the separate assemblies 11, 12, and 13 in detail, attention should be called to a piston ram 40 having one of its terminal ends pivotally connected through an arm on the slip bearing hub carried by shaft 25, and its opposite terminal end pivotally carried by the frame work of the apparatus 10. Since the sprockets 27 and 28 are mounted on the "slip" bearings on shaft 25 the drum assembly 11 and the saw positioning switching box assembly 32 may be synchronously adjusted independently of the driven transmission train in response to movement of the ram of the piston 40. The reason for adjusting the drum assembly 11 and the box assembly 32 shall become more apparent from the description of operation of the elements hereinafter later set out.

Figure 2:
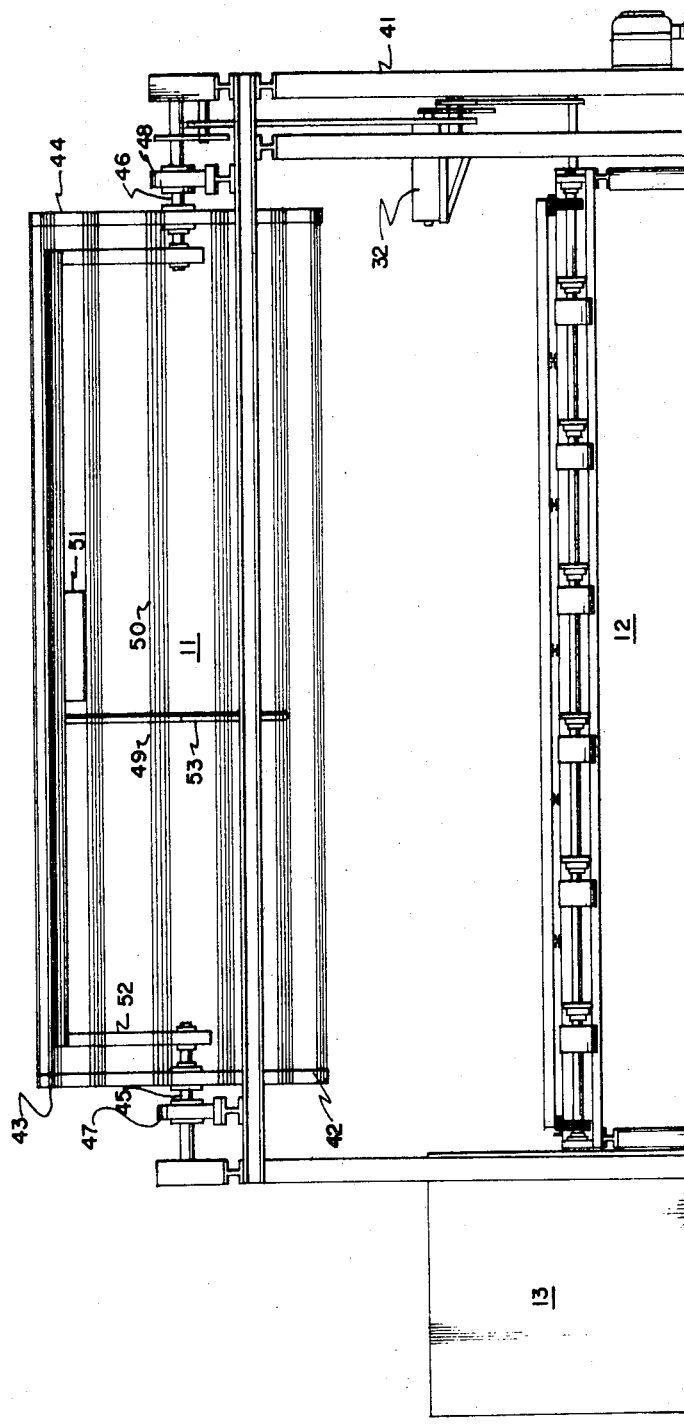
FIG. 2 is an end elevational view of this invention as viewed from the in-feed end of the conveyor assembly.

Referring now to the FIG. 2 which advantageously shows a side elevational view as viewed from the entrance end of the light indexing rotating drum assembly 11. The drum assembly 11 comprises a framework 41 having an indexing drum 42 distally mounted on the framework 41 above the conveyor table assembly 12. The drum 42 is provided with a pair of opposing round end plates 43 and 44 carried by respective shafts 45 and 46 journaled for rotation in bearings 47 and 48 mounted on the framework 41 at opposite terminal ends of the drum 42, a multiplicity of equally spaced unit groups 49 of indexing wires 50 attached at their respective opposite terminal ends to each of the end plates 43 and 44, a light source 51 suitably mounted inside drum 42 such as by substantially U-shaped light support 52 carried by respective shafts 45 and 46, and an indexing wire parallax guide 53. In operation the light is directed through unit groups 49 of indexing wires 50 as the wires 50 pass under the light source to project a shadow image of the wires 50 onto conveyor table assembly 12. The synchronously driven drum 42 is driven at a rate of speed commensurate with rate of travel of the conveyor assembly 12. As the unit groups 49 of indexing wires 50 are caused to travel over parallax guide 53 the wires 50 tend to be flat in a plane which tends to overcome distortion of the shadow image projected.

Figure 3:
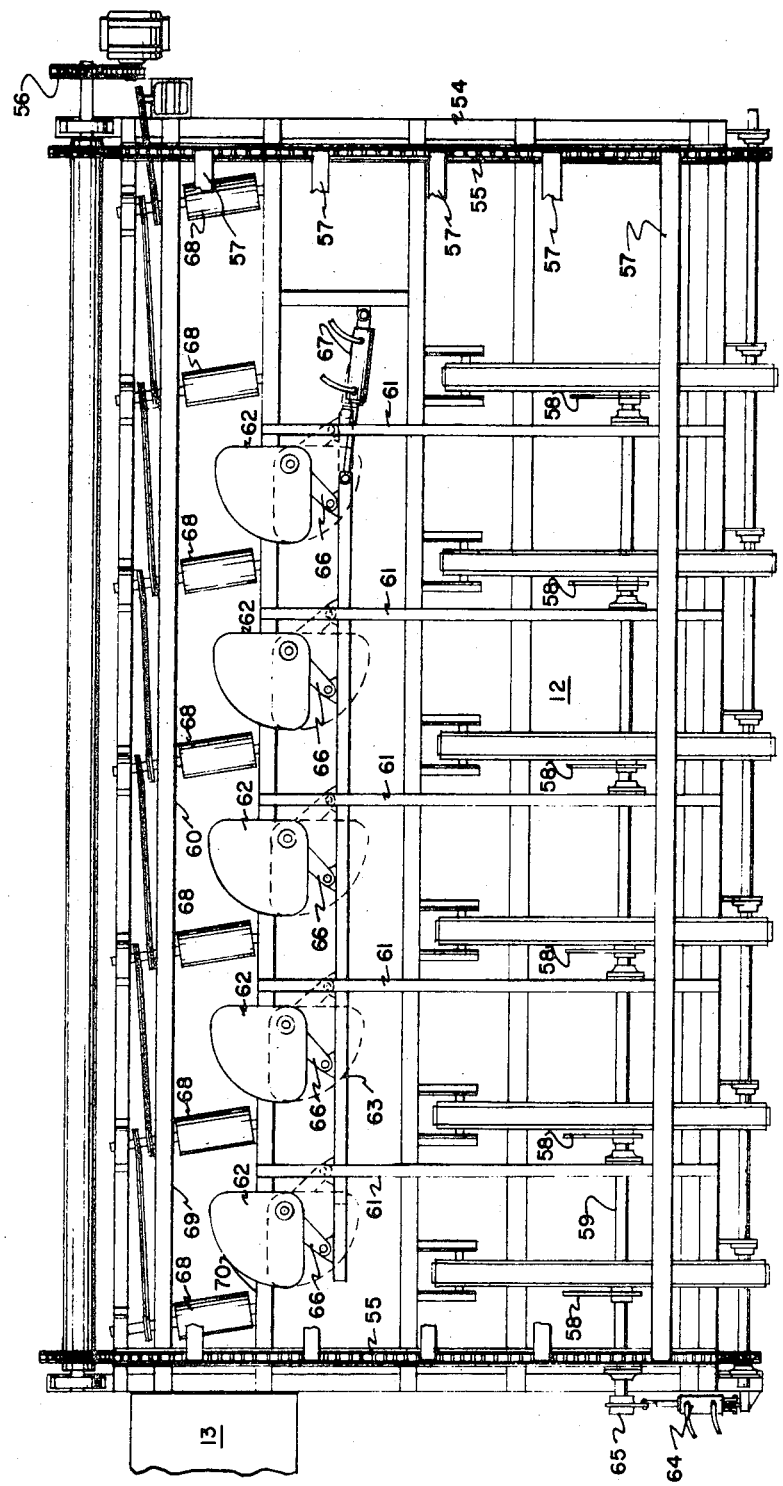
FIG. 3 is a plan view of the conveyor assembly to a larger scale.

The conveyor table assembly 12 is positioned between terminal sides of the framework 41 and is oriented transversely to the drum assembly 11. The conveyor table assembly 12 is shown to advantage in the side elevational view of FIG. 1 and plan view of FIG. 3. The conveyor table assembly 12 comprises a table-like framework 54 including a pair of opposing endless chains 55 driven about respective driving sprockets 56 carried by shaft 19 at the opposite terminal sides of the framework 54, a multiplicity of guide bars 57 carried by the endless chains 55 and equally spaced apart in parallel relationship on the chain, a multiplicity of substantially L-shaped positioning pawls 58 mounted on a shaft 59 journaled for rotation in the frame 54 and operable to position lumber against guides 57 in response to movement of the shaft 59, a cross conveyor assembly 60 operable to carry lumber to the saw assembly 13, a multiplicity of support I-beam means 61 on the framework 54 from one of the terminal ends thereof to the cross conveyor assembly 60, and a multiplicity of pivotally mounted lumber delivery camming plates 62 operable for movement over the cross conveyor assembly 60 in response to movement of an operating arm 63 to deliver lumber to the conveyor 60. The guides 57 are spaced apart on the chains 55 to coincide with shadow images projected by the wires 50 of unit groups 49 on the drum assembly 11. Similarly the unit groups 49 of wires 50 are equally spaced around the periphery of the drum 42 so that each of the unit groups 49 on the drum 42 are geometrically coincident with respective guide bars 57, there being one unit group 49 of wires 50 for each guide bar 57 on the conveyor assembly 12. A piston ram 64 mounted on the framework 54 is connected to an eccentric bracket 65 on one of the terminal ends of the shaft 59 to cause rotation of the shaft 59 in response to movement of the piston ram 64. The shaft 59 causes the upstanding lumber positioning pawls 58 to be moved into the path of lumber on the table and to move that lumber against a guide bar 57. The piston ram 64 may be electrically connected to a control means operable to cause movement of the ram each time a guide bar 57 is caused to pass over the terminal end of the pawls 58 in response to force exerted on the pawls 58 when lumber is positioned against a guide bar 57.

In operation, when lumber is positioned against a guide bar 57, the shadow images of wires 50 of a unit group 49 coincident with a respective bar 57 is projected onto the lumber. The shadow images may be adjustably positioned on the lumber by operating the ram 40 to cause movement of the sprockets 27 and 28 carried by the "slip" bearing mounted on the drive shaft 25 of the drum assembly 12. The movement of the sprockets 27 and 28 may be compared to the forward and reverse movement of a bicycle drive sprocket before driving or braking engagement. Alignment of shadow images on lumber causes rip saws to be aligned with the lumber as hereinafter later described so that rough, uneven edges may be cut from the lumber and so that the lumber may be cut into selected widths so that sections having undesirable knots may be cut out. Since the drum 42 and the conveyor assembly 12 are synchronously driven, adjustment of the respective shadow images on successive pieces of lumber may be accomplished without interruption in the travel of the conveyor.

The operating arm 63 is connected to the camming plates 62 by a multiplicity of respective brackets 66. A piston 67 mounted on the framework 54 is connected to one of the terminal ends of the arm 63. As lumber is carried over the support means 61 by the guide bars 57 and over the cross conveyor 60, the cam plates 62 are caused to be pivoted over the cross conveyor 60 in response to movement of the piston 67 and to hold lumber flat over the cross conveyor 60. When the plates 62 are retracted the lumber is caused to drop flat upon the cross conveyor 60. It should be noted that without cam plates 62 lumber would tend to fall over the terminal ends of support means 61 on its edge as it was moved over the ends by the guide bars 57.

The cross conveyor 60 is provided with a multiplicity of driven rollers 68 disposed at an angle between a pair of opposing channel side frame members 69 and 70. The channel member 70 provides a side wall fence operable to guide lumber into the saw assembly 13. The rollers 68, being at an angle, tend to cause the lumber to be moved along and against the fence 70. Since the guide bars 57 are intended to provide a datum reference with respect to positioning shadow images upon the lumber, and since the drum 42 carrying the wires 50 is interconnected to saw positioning control means 32 hereinafter later described, it is desireable to provide a fence 70 which is coincident to the datum reference of the guide bars 57 to direct lumber into the saw assembly 13 entrance at a position relative to that reference.

The saw assembly 13 is typical of edging saws commonly used in lumber mills. Such saw assemblies generally include a multiplicity of circular saws independently carried on a mandrel and spaced apart at preselected intervals. Each of the saws are pivotally mounted so that any number of preselected saws may be articulated into the path of lumber traveling rectilinearly through the saw housing to cut a preselected number of boards of selected widths from one piece of lumber. The saws are provided with means of collectively moving the saws together transversely on the mandrel in the housing to position the saw blades with the lumber entering the housing. Since such saw assemblies are well known to those skilled in the art, further description here would appear redundant. Suffice it to say here that wires 50 of unit groups 49 on the drum 42 are geometrically coincident with the preselected spacing of saw blades on the mandrel of the saw assembly 13 so that the shadow images of the wires 50 projected on a piece of lumber is coincident with saw blades on the mandrel.

Referring now to the FIG. 1 which shows to advantage the saw positioning switching box 32 electrically connected to saw positioning operating means on the mandrel of saw assembly 13. Although it is to be understood that control box 32 may be any of a variety of commonly known electrical switching controllers, the box 32 here disclosed comprises a sequentially operated relay switching apparatus having a multiplicity of parallel discs mounted for rotation on the shaft 31 to sequentially operate relay switches in the box. A disc in the box 32 is associated with a respective unit group 49 of wires 50 on the drum 42. Similarly, each unit group 49 of wires 50 is associated with a respective guide bar 57 on the conveyor table assembly 12. Hence, the saws on the mandrel are caused to be transversely moved to a point on the mandrel coincident with the position of a contactor on the peripheral edge of a disc which is also coincident with the position of a particular unit group 49 of wires 50 on the drum 42 and an associated guide bar 57 on the conveyor assembly 12. Aligning adjustment of shadow images of a unit group 49 of wires 50 on lumber carried by a guide bar 57 on the conveyor table assembly 12 tends to cause momentary interruption of the synchronous driving movement between the conveyor assembly 12 and the drum assembly 11 including the discs mounted on the shaft 31 of the control box 32 thereby causing a time sequence delay in the operation of a related switch in the box 32. Hence, the transverse positioning travel of saws on the mandrel in the saw assembly 13 is not interrupted until a time sequence switching position is reached in response to the rotation of a respective disc in the box 32. It is to be remembered that the driving sprockets 27 and 28 are carried on a "slip" bearing carried by the shaft 25 and may be adjustably moved together in response to movement of the ram 40, thereby adjusting the synchronous rate of travel of both the drum 42 and the discs on shaft 31 journaled for rotation in the control box 32. Adjusting movement of the sprockets 27 and 28 carried by the "slip" bearing carried by the shaft 25 may be compared to the sprocket driving arrangement of a bicycle.

The saw selector switching box 22 includes a multiplicity of gang groups of sequentially operable relay switching apparatus electrically connected to respective saw raising and lowering means associated with each saw in the housing of the saw assembly 13. By selectively engaging switches in each of the gang groups only preselected saws may be caused to come into engagement with a particular piece of lumber as it travels through the saw assembly 13 while other saws will remain out of engagement therewith. Similarly succeeding selected saws may be positioned for successive pieces of lumber on the table by presetting switches of successive sequentially operated gang groups in the control box 22. Suffice it to say that a gang group of switching apparatus may be operatively associated with each guide bar 57 on the conveyor table assembly 12.

In operation, the drum assembly 11 and the conveyor table assembly 12 may be normally synchronously driven by the motor 14. Individual pieces of lumber are delivered to the conveyor table assembly such as by a cam lifter of the type and character described in my copending application and each piece of lumber is caused to fall upon the conveyor table assembly 12. The upstanding pawl 58 is caused to be pivotally moved into the path of the lumber on the conveyor in response to movement of the piston ram 64 and to be positioned against a guide bar 57 carried by the conveyor drive chains 55. Light from the source 51 mounted in the drum 42 causes shadow images of a respective unit group 49 of wires 50 to be projected onto lumber carried by the guide bar 57 on the conveyor table assembly 12. Since the drum assembly 11 is caused to rotate at a rate of speed commensurate with the rate of travel of the conveyor table assembly, shadow images of a respective unit group 49 of wires 50 are caused to move with the respective piece of lumber. As earlier described alignment of shadow images on a selected piece of lumber on the conveyor table assembly 12 may be accomplished by positioning the sprockets 27 and 28 on the shaft 25 through the "slip" bearing in response to movement of the piston 40. When shadow images are aligned as desired upon a selected piece of lumber, the position may be electrically set by switching a relay in the control box 32 which in turn causes saws in the housing of saw assembly 13 to be transversely positioned on the mandrel for engagement with the selected piece of lumber. Similarly, particular selected circular saw blades may be electrically preset through the control box 22 to be lowered into engagement when the selected piece of lumber is caused to be rectilinearly moved through saw assembly 13. As unit groups 49 of wires 50 are moved across parallax guide 53 in response to rotation of the drum 42, the wires 50 are caused to be planarly disposed which tends to overcome optical distortion of the projected shadow images of the wires 50. As the lumber travels on the conveyor table assembly to the cross conveyor 60, cam plates 62 are pivotally moved over the cross conveyor 60 in response to movement of the piston 67 and the operating arm 63 to support the lumber over the cross conveyor 60 until cam plates 62 are retracted to their respective position in response to the timed sequence operation of the ram 67. That is to say that the cam plates 62 are caused to support a selected piece of lumber until the lumber is moved by a related guide bar 57 to a preselected point over the cross conveyor 60, at which time the cam plates are pivotally moved to permit the selected piece of lumber to drop planarly flat upon the cross conveyor 60. The drive rollers 68 being set at an angle between the side channel frame members 69 and 70 tend to cause the lumber to be driven and guided along the channel 70 and rectilinearly into the saw assembly 13. The saws on the mandrel in the saw assembly are caused to be transversely positioned in response to the operation of electrically preset switching relays as earlier described, and preselected circular saw blades are similarly caused to be lowered to saw the piece of lumber as described. It is to be remembered that the saw blades in saw assembly 13 are spaced apart at intervals geometrically coincident with wires 50 of each of the unit groups 49 on the drum 42.

Conventional means may be suitably located on the machine of the present invention to effect operation of the various hydraulic or pneumatic assemblies herein shown and described. Although we have herein shown and described preferred combinations and subcombinations of the present machine and method, it is, of course, to be understood that various changes may be made herein. The more advantageous features of the invention, forming subassemblies of the complete machine, are usable apart form each other. Accordingly the invention is not to be considered limited to the structure and uses particularly described herein, but rather only by the scope of the appended claims.

I claim:

1. In a moving shadow light indexing means the combination of a framework, a rotatable drum assembly carried by said framework, a conveyor means disposed transversly beneath said drum being operable to carry work materials rectilinearly on said conveyor means transversely beneath said rotating drum, said drum including target indicia means mounted on said drum, light projecting means mounted in said drum being operable to project a shadow image on said conveyor means, datum reference means on said conveyor means being operable to move in response to movement of said conveyor means, datum reference means on said rotatable drum, said datum reference means on said conveyor means being aligned with said datum reference means on said rotating drum, driving means on said conveyor means and driving means on said rotatable drum being operable to synchronously drive said conveyor means and said rotatable drum.

2. The apparatus of claim 1 including means on the conveyor operable to align work material carried by said conveyor with said datum reference means on said conveyor means.

3. The apparatus of claim 2 including means on said rotatable drum driving means to selectively vary the rate of speed of said drum and being operable to selectively align said projected shadow images on said work material.

4. The apparatus of claim 3 including means drivingly interconnecting said rotatable drum driving means and machine tool positioning means, a machine tool mounted in operative engaging relationship with said conveyor to receive work material discharged from said conveyor means.

5. The apparatus of claim 3 in which said target indicia means comprises a multiplicity of wires rectilinearly disposed on said drum and suitably fastened at their respective opposite terminal ends to the terminal ends of said rotatable drums.

6. The apparatus of claim 5 including target indicia parallex guide means being operable to engage said wires and to tend to prevent optical distortion of the projected shadow image upon work material carried by said conveyor means.

* * * * *